Patented Sept. 30, 1947

2,428,302

UNITED STATES PATENT OFFICE 2,428,302

COLORED GLASS FIBER PRODUCT

William Leon Trowbridge, Zanesville, Ohio, assignor to Owens-Corning Fiberglas Corporation, a corporation of Delaware No Drawing. Application April 9, 1943, Serial No. 482,475

2 Claims. (Cl. 117—124)

This invention relates generally to fibrous glass and particularly to the treatment of glass fibers to color the fibers and to enhance the properties of the fibers in other respects.

There are many uses of glass fibers and fibrous glass products in which the fibers might advantageously be colored. For instance, where glass fibers are used for electrical insulation on wire and cables it is desirable oftentimes to employ glass fibers of different colors so that the insulated conductors will carry some means of identification whereby the electrical circuits may be traced. Also, colored glass fibers are desirable where yarns or fabrics made from the fibers are used for decorative purposes.

Attempts to produce colored glass fibers commercially have met with several obstacles. The attenuation of fibers from colored glass has not been fully successful in providing all colors because the inclusion of some of the required coloring agents in the glass batch so alters the properties of the glass that high speed commercial production of fibrous glass from the glass has been difficult. The kinds of coloring agents that might be employed with success are therefore limited as far as attenuation of the colored glass is concerned and consequently relatively few colors can at present be obtained by this means.

Dyeing of the finished fibers has heretofore not been successful because of the impermanence of the colors on fibers treated in this way, which impermanence shows up as crocking or bleeding. Apparently this has been due in large measure to the fact that the very smooth surfaces of the non-hygroscopic glass fibers do not permit permanently secure attachment of dye or pigments to the surfaces of the fibers, and, of course, there can be no actual coloring of the glass of the fibers by the dyeing procedures now known in the art. Most coloring of glass fibers by means of dyes has been open to the serious objections that the colors readily bleed and are removed by water and other common solvents even in cases where the dyes themselves were insoluble. An apparent explanation for this lies in the fact that glass displays a high affinity for water so that most materials applied to glass surfaces are readily displaced by water.

Further, coloring and dyeing substances that are highly insoluble in water most usually require application in special solvents which are costly and may also be poisonous or otherwise hazardous, for instance, by being inflammable. This complicates application of such coloring material and also the production of the fibers where the materials are to be applied during the fiber forming operation.

It is the object of the present invention to provide colored glass fibers that are not limited as to the range of colors possible and that may be produced economically and without adverse effect upon presently used fiber forming processes.

It is an object of the present invention to coat glass fibers preferably during the forming operation with a dyed or colored film forming material in aqueous solution and then insolubilize the dye or coloring agent in the film. By this procedure the material used to coat the fibers may be applied using water as a vehicle, thereby obviating the difficulties encountered if other solvents were to be used.

It is a further object of the invention to provide glass fibers coated with a dyed or colored film forming material that may also be insolubilized. This provides an insoluble film on the fibers colored with an insoluble dye, effectively preventing bleeding of the colors.

It is a further object of the invention to coat glass fibers with a film forming material colored with a dye both of which may be insolubilized by a single agent, thereby simplifying the treating material.

The foregoing, as well as other objects, will be made more apparent upon consideration of the following detailed description of the invention.

The material employed in this invention for coating the glass fibers comprises essentially a film forming material, a coloring agent or dye, an insolubilizing agent and a vehicle, preferably water. The film forming material is preferably in the form of a protein material and particularly satisfactory results are obtained by using a plasticized glue, such as one of those commonly available in the trade and containing glycerine, sorbitol, corn-syrup or the like as plasticizing agent. These are sometimes referred to as flexible glues. One such material is available as "Gresistoflex." Other protein substances such as albumin, gelatin, and materials having similar characteristics have been found suitable.

The coating material is applicable to strands, yarns, fibers or woven fabrics of glass fibers in any suitable manner. It is usually desirable, however, to apply the coating material to the fibers during the process of forming the fibers.

One fiber forming process involves flowing molten glass streams from a container or bushing and continuously attenuating the streams to form fibers by means of a rotating drum upon which the fibers are wound. Intermediate the container and drum the fibers are gathered together into a strand by a guide provided with means for applying a lubricating and binding material to the fibers as they are gathered to protect the fiber surfaces against mutual abrasion and to bind or cement the fibers together into an integral strand. This procedure is more fully disclosed in the Fisher Patent No. 2,224,149.

The present coating material is adaptable to application to the fibers or strand in the same manner, and may replace with advantage the lubricating and binding material ordinarily used or may be applied in addition to the lubricating and binding material. It includes a film forming substance that is effective as a binder to cement the fibers together, and may have lubricating properties imparted thereto by admixture with a suitable glass surface lubricant such as, for example, cationic-active amine compounds.

When applied in this way during the fiber forming process, the present coating material uniformly coats each individual fiber to form a substantially continuous film over each fiber surface. Because the material is applied to the individual fibers as they are gathered, every fiber in the strand is coated to the same extent so that fibers within the strand carry a film as well as the fibers at the outer periphery of the strand. In the case of colored fibers this is highly important because greater uniformity, a higher degree of permanence, and a more pleasing appearance result where the strand is colored uniformly throughout its body.

One coating material which has been found particularly satisfactory in forming films or coatings of a variety of colors in accordance with the present invention is as follows:

|  | Per cent |
|---|---|
| Direct formaldehyde setting dye | 2 |
| Protein binder (Gresistoflex) | 3 |
| Cationic-active amine (octadecyl stearyl monoamine acetate) | 0.5 |
| Formalin (30 to 40% solution) | 2 |
| Water | 92.5 |

This particular formula is given merely for the purpose of illustrating the invention and is subject to various alterations to satisfy different conditions. For example, the percentages are not critical and may be varied as found desirable, and it is also possible to eliminate the cationic-active agent in cases where lubricity is not required in the film on the fibers or it may be replaced with other materials such as oil or wax. The protein binder may consist of either Gresistoflex or gelatin, or others of the materials previously mentioned, either alone or in combination, the essential limitation being that the protein binder is insolubilized by the formaldehyde.

The dye or coloring agent in the coating material is one that may be insolubilized and is preferably any one of a number of direct formaldehyde setting dyes including those dyestuffs which contain two hydroxyl groups or two amino groups in the meta position in their end component—as with azo dyes containing resorcinol or m-amidophenol or m-phenylene-diamine. Dyes are much preferred to pigments because in many cases the pigment particles are as large as or larger than the diameter of the glass fibers and present difficulties in obtaining uniform coloring of the fibers. Examples of direct formaldehyde setting dyes capable of being used are those available under the trade names of "Amanil," "Azoform," "Benzoform," "Calcoform," "Formalide" and "Formanil." Other known direct formaldehyde setting dyes may, of course, be employed. These dyes are originally water soluble but are insolubilized by the action of the formaldehyde in the coating. Any one of a number of different colors or color combinations may be imparted to the fibers and these colors are fast to most solvents encountered in the use of the fibers.

Any of the cationic-active amine compounds which are compatible with the covering material may be employed. In addition to increasing the lubricity of the coating on the fibers, these compounds successfully prevent destructive abrasion of the fiber surfaces in the presence of the water in the coating material. Other cationic-active compounds such as cetyl monoamine hydrochloride or acetate, stearyl ammonium bromide and methyl benzyl stearyl sulphonium methyl sulphate, may replace the monoamine acetate in the above composition.

If it is found desirable or more convenient, the coating material of the present invention may be applied as an after-treatment to the strands, yarns, or fabrics of glass fibers instead of during the forming operation. Also, the formaldehyde may be applied as an after-treatment instead of being included in the coating material mixture. The strands, yarns or fabrics coated with this modified coating material are in this case dipped into or sprayed or otherwise wetted with a formalin or other formaldehyde-containing solution to insolubilize the dye and the binder.

There are various ways in which the several ingredients may be mixed to form the desired coating material. One method is to mix the dye and about three-fourths of the water and agitate the solution until all lumps have disappeared. The solution is then heated to a temperature of about 200° F. and the Gresistoflex added with the solution still under agitation, and the mixture is heated to the boiling point. The mixture is then allowed to cool to about 150° F. and the amine compound added, and when it has cooled to room temperature the formaldehyde and the balance of the water are added.

A slightly different method and one that is preferable where intensity of color is most desired is to boil the selected direct formaldehyde setting dye in water with thorough agitation to form a true solution. This solution is then allowed to cool to a temperature approximating 160° F. and the protein binder is added. This solution is then applied to the fibers, yarn, or strands of glass fibers and dried. Upon completion of this operation a solution containing the cationic-active amine compound and the formalin is applied as an after-treatment in any suitable manner. This two-step treatment may be carried out on an ordinary yarn slasher in the case where yarns and strands are coated and colored.

By following this latter procedure, it is possible to eliminate the formation of large aggregate particles during mixing of the ingredients and a uniformly thin coating or film on the fibers results.

The invention not only provides an efficient process for coloring the fibers but has the added advantage of decreasing the capillarity of yarns and fabrics of glass fibers. This is important where the fibrous glass is used for electrical insulation since it sharply limits moisture penetration of the insulation. If reduction of capillarity is the only object, the dye may, of course, be eliminated. The capillarity or the moisture absorption factor of the coating may be further definitely reduced by applying acetylated polyvinyl acetate or aluminum stearate to the coated fibers.

The coating is applicable to the fibrous glass product at practically any stage of fabrication of the latter, and in all cases provides a coating or film on the fiber surfaces that is insoluble to water and most organic solvents. This insoluble film is colored with a dye likewise insoluble to water and most organic solvents, providing permanent fast colors.

I claim:

1. A product of manufacture comprising a fabricated textile body of glass fibers, the individual fibers of the body having a coating thereon which includes the reaction product of formaldehyde with gelatin and a direct formaldehyde setting dye.

2. As a product of manufacture, a yarn of glass fibers, the individual fibers of the yarn being coated with a material comprising the reaction product of formaldehyde with a direct formaldehyde setting dye and gelatin, and a film of transparent material on the individual fibers and covering said coating.

WILLIAM LEON TROWBRIDGE.

REFERENCES CITED

The following references are of record in the file of this patent:

UNITED STATES PATENTS

| Number | Name | Date |
| --- | --- | --- |
| 2,133,238 | Slayter | Oct. 11, 1938 |
| 2,145,235 | Cryor | Jan. 31, 1939 |
| 2,195,272 | Ehlers | Mar. 26, 1940 |
| 2,215,061 | Alt | Sept. 17, 1940 |
| 2,266,823 | Sparks | Dec. 23, 1941 |
| 2,333,023 | Manor | Oct. 26, 1943 |
| 2,193,818 | Kajita | Mar. 19, 1940 |
| 2,106,519 | Conzetti | Jan. 25, 1938 |
| 2,361,277 | Enderlin et al. | Oct. 24, 1944 |
| 2,073,666 | Wernlund | Mar. 16, 1937 |
| 852,943 | Fortner | May 7, 1907 |

FOREIGN PATENTS

| Number | Country | Date |
| --- | --- | --- |
| 483,550 | Great Britain | Apr. 11, 1938 |
| 13,916 | Great Britain | 1897 |
| 7,284 | Great Britain | 1915 |
| 325,036 | France | Dec. 31, 1902 |